May 24, 1938.  A. D. SLACK ET AL  2,118,059
ANTISTATIC PHOTOGRAPHIC FILM
Filed Sept. 20, 1935

Fig. 1.
- EMULSION (12)
- GELATIN CONTAINING HIGHER FATTY ALCOHOL OR ESTER SULFATE (11)
- NITRATE SUPPORT (10)

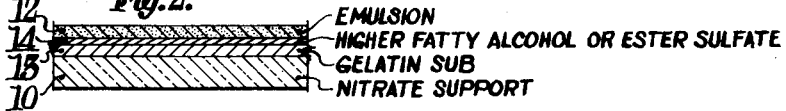

Fig. 2.
- EMULSION (12)
- HIGHER FATTY ALCOHOL OR ESTER SULFATE (14)
- GELATIN SUB (13)
- NITRATE SUPPORT (10)

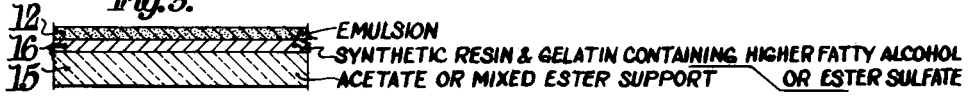

Fig. 3.
- EMULSION (12)
- SYNTHETIC RESIN & GELATIN CONTAINING HIGHER FATTY ALCOHOL OR ESTER SULFATE (16)
- ACETATE OR MIXED ESTER SUPPORT (15)

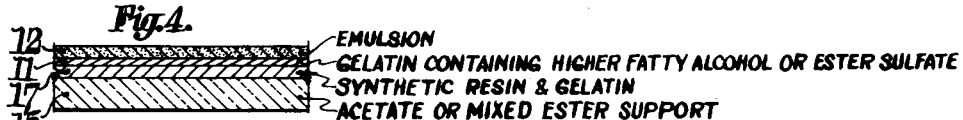

Fig. 4.
- EMULSION (12)
- GELATIN CONTAINING HIGHER FATTY ALCOHOL OR ESTER SULFATE (11)
- SYNTHETIC RESIN & GELATIN (17)
- ACETATE OR MIXED ESTER SUPPORT (15)

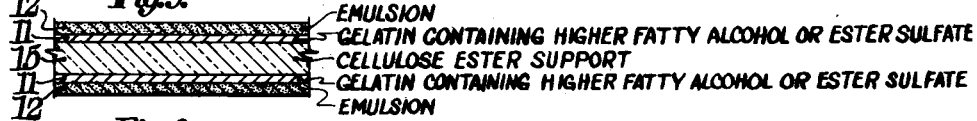

Fig. 5.
- EMULSION (12)
- GELATIN CONTAINING HIGHER FATTY ALCOHOL OR ESTER SULFATE (11)
- CELLULOSE ESTER SUPPORT (15)
- GELATIN CONTAINING HIGHER FATTY ALCOHOL OR ESTER SULFATE (11)
- EMULSION (12)

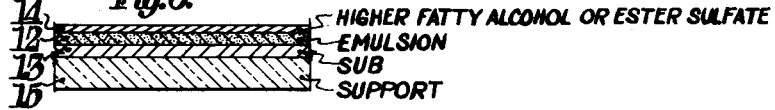

Fig. 6.
- HIGHER FATTY ALCOHOL OR ESTER SULFATE (14)
- EMULSION (12)
- SUB (13)
- SUPPORT (15)

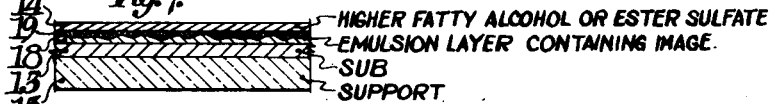

Fig. 7.
- HIGHER FATTY ALCOHOL OR ESTER SULFATE (14)
- EMULSION LAYER CONTAINING IMAGE (18)
- SUB (13)
- SUPPORT (15)

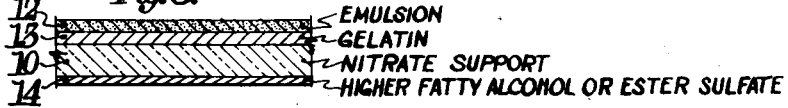

Fig. 8.
- EMULSION (12)
- GELATIN (13)
- NITRATE SUPPORT (10)
- HIGHER FATTY ALCOHOL OR ESTER SULFATE (14)

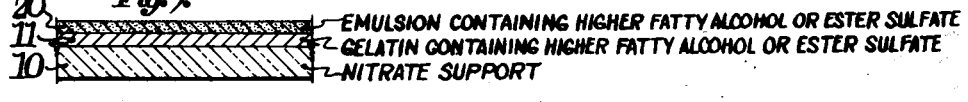

Fig. 9.
- EMULSION CONTAINING HIGHER FATTY ALCOHOL OR ESTER SULFATE (20)
- GELATIN CONTAINING HIGHER FATTY ALCOHOL OR ESTER SULFATE (11)
- NITRATE SUPPORT (10)

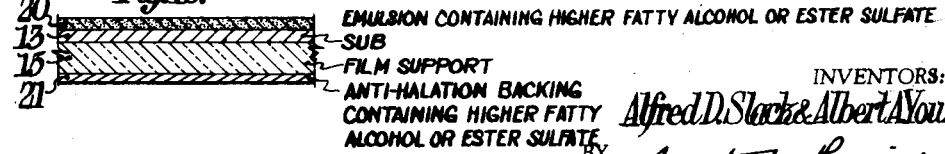

Fig. 10.
- EMULSION CONTAINING HIGHER FATTY ALCOHOL OR ESTER SULFATE (20)
- SUB (13)
- FILM SUPPORT (15)
- ANTI-HALATION BACKING CONTAINING HIGHER FATTY ALCOHOL OR ESTER SULFATE (21)

INVENTORS:
Alfred D. Slack & Albert A. Young,
BY
Newton M. Perkins
R. Frank Smith
ATTORNEYS.

Patented May 24, 1938

2,118,059

UNITED STATES PATENT OFFICE 2,118,059

ANTISTATIC PHOTOGRAPHIC FILM

Alfred D. Slack and Albert A. Young, Rochester, N. Y., assignors, by mesne assignments, to Eastman Kodak Company, Jersey City, N. J., a corporation of New Jersey Application September 20, 1935, Serial No. 41,417

10 Claims. (Cl. 95—9)

This invention relates to photographic film and, more particularly, to film having anti-static coatings.

A great amount of trouble is caused during the manufacture or use of photographic film on account of the accumulation of the electrical charges on the film. These electrical charges are known as static and may be caused by friction of the film against the rolls or other portions of the machines through which it passes or merely by contact with dissimilar surfaces, these and other causes being known to those skilled in its manufacture. Static discharges in an unexposed film manifest themselves by the formation of irregular streaks or lines caused by exposure of the emulsion at such portions. Static charges are also objectionable in finished film and cause an increase in the friction in the film against the gates of a projector or other parts of the mechanism through which the film passes. Attempts to overcome static in photographic films have, for the most part, followed the lines of applying conducting or hygroscopic materials to the surface of the film in order to increase its electrical conductivity and thereby dissipate the electrical charges.

The principal object of the present invention is to provide an improved means for reducing friction, in some cases giving both surfaces a similar identity and thus eliminating the static charges on a photographic film. A further object is to provide means for reducing the static in a photographic film base during coating of the sensitive emulsion.

These objects are accomplished in the present invention by incorporating in layers of the film or on the surface of the film, materials such as sulfates of the higher fatty alcohols, sulfates or sulfonates of the higher fatty esters, or sulfonated amides.

In the accompanying drawing, Figures 1 to 10 are sectional views of film having anti-static coatings formed according to our invention.

One type of material which we may use to prevent the formation of static charges on the film is the class of sulfates of the higher fatty alcohols, particularly the normal primary alcohols. These products are formed by reacting sulfuric acid with fatty alcohols, such as those produced by esterifying higher fatty acids with lower aliphatic alcohols and reducing the mixture of esters to alcohols. These sulfates of the higher fatty alcohols are described, for example in U. S. Patents 1,968,793, 1,968,794, 1,968,795, 1,968,796 and 1,968,797, and are sold under the trade names Gardinol, Avirol, Nacconal, etc. These materials consist for the most part of the sulfates of oleyl, lauryl, stearyl, cetyl, or octadecyl alcohols. We may also use other sulfated or sulfonated compounds containing higher fatty radicals, such as those materials known as Igepon, and described in U. S. Patents 1,881,172 and 1,932,180. These compounds are, for the most part, sulfates or sulfonates of the higher fatty esters or sulfonated amides. The production of these materials, however, forms no part of our invention.

We contemplate applying these materials to the film in various ways to decrease or eliminate static. They may be applied to the film base; (1) as a constituent of a gelatin sub layer or coated over a gelatin sub layer applied to the base; (2) to the finished film either on the back, over or in the sensitive emulsion, or (3) to the surface of the exposed and developed film. The various ways of applying these materials according to our invention will now be described, having particular reference to the accompanying drawing.

As shown in Fig. 1, a film base 10 of transparent material such as cellulose nitrate is coated with a thin gelatin sub layer 11 to which has been added a higher fatty alcohol or ester sulfate. The sensitive emulsion layer 12 is coated directly over this gelatin layer containing the sulfate. In the modification shown in Fig. 2, the base 10 is coated with the usual gelatin sub layer 13 and directly over this is coated a solution of a higher fatty alcohol or ester sulfate 14. The sensitive emulsion 12 is coated directly on this layer 14. Fig. 3 illustrates a film base of a cellulose ester, such as cellulose acetate or a mixed ester such as cellulose acetate propionate 15, coated with a sub layer 16 which may be a mixture of a synthetic resin and a gelatin containing a higher fatty alcohol or ester sulfate, and on which is coated the sensitive emulsion layer 12. The anti-static layer may also be coated as a separate layer in this case as shown in Fig. 4 in which 17 represents a sub layer of a mixture of a synthetic resin and gelatin having coated thereon a layer 11 of gelatin containing a higher fatty alcohol or ester sulfate and on which is coated the sensitive emulsion layer 12.

In the modification shown in Fig. 5 the base 15 of cellulose ester is coated on both sides with a layer 11 of gelatin containing a higher fatty alcohol sulfate. The sensitive emulsion layers 12 are coated on these anti-static layers 11. It has been found that the static formed in a film coated on both sides is materially reduced when coating the second sensitive emulsion layer if one of the anti-static materials, according to our invention, is previously applied to the film.

In Fig. 6 is shown a film consisting of a base 15 of cellulose ester or other suitable material coated with the usual gelatin sub 13 and sensitive emulsion layer 12. The anti-static layer 14 consisting of the higher fatty alcohol or ester sulfate solution is coated over the sensitive emulsion layer 12. In Fig. 7 the emulsion layer 18 has been exposed and developed to form a silver image 19 and the finished film is coated with a layer 14 of a higher fatty alcohol or ester sulfate.

The anti-static layer may be applied to the reverse side of a film having a sensitized emulsion surface, as shown in Fig. 8, in which 10 represents a nitrate film base having the usual gelatin sub 13 and emulsion layer 12. The anti-static layer 14 consisting of a solution of a higher fatty alcohol or ester sulfate is coated on the reverse side of the film base.

The anti-static material may also be mixed with the sensitive emulsion as shown in the modification of Fig. 9, in which 10 is the usual nitrate base and is coated with a subbing layer 11, which may consist of gelatin and a higher fatty alcohol or ester sulfate. On this subbing layer the emulsion layer 20 containing a higher fatty alcohol or ester sulfate is laid.

Fig. 10 illustrates an anti-halation film backing containing a higher fatty alcohol or ester sulfate anti-static material. As shown in Fig. 10, 15 is a film base of cellulose acetate or mixed ester coated with a gelatin subbing layer 13 and emulsion layer 20 which contains a higher fatty alcohol or ester sulfate. The anti-halation layer 21 containing a higher fatty alcohol or ester sulfate is coated on the reverse side of the base 15.

The higher fatty alcohol or ester sulfate used as an anti-static material, according to our invention, may be applied to the film either in a solvent or in a non-solvent for the film base. Where it is applied in the sensitive emulsion or over or in a layer adjacent to a sensitive emulsion it will obviously be applied in a solution of which the solvent does not adversely effect the sensitive emulsion. The materials may be applied for example in a water solution or in a solution of a hydrocarbon, such as benzene or toluene, or in a solution of an alcohol, such as methyl, ethyl, or higher alcohol.

The following specific examples will illustrate solutions which may be used in applying the anti-static materials according to our invention:

(1) Oleyl sulfate (concentrated) ___gram__ 0.5
    Methyl alcohol _____cc_____ 100

(2) Lauryl sulfate _____gram__ 0.25
    Toluene _____cc_____ 100

(3) Gelatin _____gram__ 0.5
    Stearyl sulfate _____gram__ 1.0
    Water _____ccs____ 30.0
    Methyl alcohol _____ccs____ 70.0

(4) Igepon AP (General Dyestuffs
    Corp.) _____gram__ 0.5
    Methyl alcohol _____cc_____ 100.0

(5) Nacconal KP (National
    Aniline) _____gram___ 1
    Methyl alcohol _____cc_____ 123

(6) Igepon T (powder) (General
    Dye) _____gram__ 0.5
    Ethyl alcohol _____cc_____ 120

(7) Gardinol WA (National
    Aniline) _____gram__ 0.5
    Water _____cc_____ 25
    Methyl alcohol _____cc_____ 95

(8) For use as a coating over the emulsion:
    Nacconal W (powder)
    (Nat. Aniline) _____gram___ 1
    Ethyl alcohol _____cc_____ 125

(9) For use as a mix with the emulsion:
    Emulsion melt _____grams__ 95
    Nacconal W (5% water
    solution) _____grams__ 5

It is to be understood that the above modifications are by way of example only and that applicants' invention is not limited to the specific methods of applying the anti-static materials described in the specification. The anti-static materials used according to this invention may be applied to photographic film in numerous other ways not herein specifically mentioned.

Having thus described our invention, what we declare is new and desire to secure by Letters Patent of the United States is:

1. A photographic element comprising a support carrying an emulsion layer and an anti-static layer containing a higher fatty alcohol sulfate containing no carboxylic acid salt group.

2. A photographic element comprising a transparent support carrying a sensitive emulsion layer and an anti-static layer containing a higher fatty alcohol sulfate containing no carboxylic acid salt group.

3. A photographic element comprising a transparent support, a sensitive emulsion layer on said support, and an anti-static layer of a higher fatty alcohol sulfate containing no carboxylic acid salt group between said support and said emulsion layer.

4. A photographic element comprising a transparent support, a sensitive emulsion layer on said support, and a layer of a material containing a higher fatty alcohol sulfate containing no carboxylic acid salt group between said support and said emulsion layer.

5. A photographic element comprising a transparent support, an emulsion layer on said support, and over said emulsion layer a layer comprising a higher fatty alcohol sulfate containing no carboxylic acid salt group.

6. A photographic element comprising a transparent support, a sensitive emulsion layer on said support, and over said emulsion layer a layer comprising a higher fatty alcohol sulfate containing no carboxylic acid salt group.

7. A photographic element comprising a transparent support, an emulsion layer on each side of said support, and at least one layer of a material containing a higher fatty alcohol sulfate containing no carboxylic acid salt group carried by said support.

8. A photographic element comprising a transparent support, an emulsion layer on each side of said support, and a layer of a material containing a higher fatty alcohol sulfate containing no carboxylic acid salt group between said support and each emulsion layer.

9. A photographic element comprising a transparent support, an emulsion layer on said support, and a layer of a material containing oleyl sulfate between said support and said emulsion layer.

10. A photographic element comprising a transparent support, an emulsion layer on said support, and a layer of a material containing lauryl sulfate between said support and said emulsion layer.

ALFRED D. SLACK.
ALBERT A. YOUNG.